(12) United States Patent
Pang et al.

(10) Patent No.: US 8,818,069 B2
(45) Date of Patent: Aug. 26, 2014

(54) METHODS FOR SCALING IMAGES TO DIFFERING EXPOSURE TIMES

(75) Inventors: Zhengyu Pang, Clifton Park, NY (US); Robert John Filkins, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 316 days.

(21) Appl. No.: 12/956,909

(22) Filed: Nov. 30, 2010

(65) Prior Publication Data

US 2012/0134603 A1 May 31, 2012

(51) Int. Cl.
*G06K 9/00* (2006.01)
*G06T 5/00* (2006.01)

(52) U.S. Cl.
CPC ....... *G06T 5/009* (2013.01); *G06T 2207/10064* (2013.01); *G06T 2207/30024* (2013.01)
USPC .......................... 382/133; 382/274; 348/221.1

(58) Field of Classification Search
CPC ............................................ G06T 2207/10064
See application file for complete search history.

(56) References Cited

U.S. PATENT DOCUMENTS

| | | | |
|---|---|---|---|
| 2003/0086002 A1 | 5/2003 | Cahill et al. | |
| 2003/0234866 A1* | 12/2003 | Cutler | 348/207.1 |
| 2004/0036775 A1* | 2/2004 | Watson et al. | 348/207.1 |
| 2006/0024756 A1* | 2/2006 | Tibbe et al. | 435/7.2 |
| 2006/0182430 A1* | 8/2006 | Stavely et al. | 396/52 |
| 2008/0158430 A1* | 7/2008 | Hu | 348/672 |
| 2009/0141959 A1 | 6/2009 | Can et al. | |

FOREIGN PATENT DOCUMENTS

| | | |
|---|---|---|
| EP | 1377026 A2 | 1/2004 |
| WO | 2009036292 A1 | 3/2009 |

OTHER PUBLICATIONS

Search Report and Written Opinion from corresponding PCT Application No. PCT/EP2011/071242 dated Feb. 7, 2012.

* cited by examiner

*Primary Examiner* — Bhavesh Mehta
*Assistant Examiner* — Andrew Moyer
(74) *Attorney, Agent, or Firm* — Jenifer E. Haeckl

(57) ABSTRACT

A method is provided for scaling an image taken at a given exposure time to a selected exposure time. The method generally comprises: determining a dark pixel intensity of an imaging device; acquiring a first image at a given exposure time; and adjusting a pixel intensity of one or more pixels in the first image, based at least in part on the dark pixel intensity, for a second exposure time that is different from the given exposure time.

13 Claims, 4 Drawing Sheets

METHODS FOR SCALING IMAGES TO DIFFERING EXPOSURE TIMES

BACKGROUND

The invention relates generally to methods for scaling an image, taken at a given exposure time, to a selected or different exposure time.

In the field of digital imaging of biological specimens stained with fluorescent markers, the need has arisen to compare images of the same field of view taken with different exposure times. In one instance there is a need to remove the autofluorescence from a specimen of a biological material. Specimens of biological materials typically contain substances which fluoresce over frequency ranges that overlap with those of commonly used fluorescent markers used to examine the tissue specimens for certain biological features. For instance, it is fairly common to stain specimens with antibodies to proteins of interest that are conjugated to well established fluorescent dyes such as Cy3 and Cy5. For example, human breast cancer tissue might be stained with antibodies to the p53 tumor suppression protein conjugated to Cy3.

One approach to removing autofluorescence from the microscopy image of tissue stained with such a fluorescent marker is to take an image of the same field of view before staining with the fluorescent marker and then on a pixel by pixel basis remove the signal intensity observed in the unstained image from the stained image. The desired result is a corrected image in which the fluorescent signal recorded in the channel of the fluorescent marker is just due to the binding of the fluorescent marker. However, for such a subtraction to result in an accurate image the two images should have substantially the same exposure time.

There are instances in which it is not convenient or possible to take both the autofluorescence image and the fluorescent marker stained image at the same exposure time. In general each type of image has its own optimum exposure time which gives the best balance between obtaining signal from the maximum number of pixels with avoiding the signal from any pixel saturating its recording channel and also the best balance between true signal and background signal. In some cases it may not be possible or practical to use an exposure time with some fluorescent markers as long as that desirable for measuring autofluorescence because at such long exposure times an unacceptably large number of the pixels are saturated, meaning that they are receiving so much signal that further signal is undetectable.

Therefore there is a need to estimate what the signals at the pixels of a fluorescent image would have been if the exposure time had been different. There have been attempts to do so by using the formula $I_{t2}=I_{t1}*(t_2/t_1)$ wherein $I_{t1}$ is the intensity for exposure time $t_1$ and $I_{t2}$ is the estimated intensity for exposure time $t_2$. However, the results of such estimates have not been fully satisfactory. There have been attempts to improve upon this estimate by subtracting the background for each exposure time according to the formula $I_{t2}=\{(I_{t1}-\text{background at } t_1)*(t_2/t_1)\}-(\text{background at } t_2)$ but the estimates still have not been as accurate as desired.

BRIEF DESCRIPTION

The methods and systems of the invention provide an accurate estimate of the intensity of the signal from a pixel of a fluorescent image of a microscope specimen at a given exposure time beginning with the actual signal intensity at a different exposure time using the dark pixel intensity of the digital camera used to take the actual image.

An example of the method, for scaling an image taken an optimal exposure time to a selected exposure time, generally comprises: determining a dark pixel intensity of an imaging device; acquiring a first image at an optimal exposure time; and adjusting a pixel intensity of one or more pixels in the first image, based at least in part on the dark pixel intensity, for a second exposure time that is different from the optimal exposure time. Determining the dark pixel intensity may comprise, setting an exposure time to zero; acquiring an intensity image; and calculating a mean intensity for the entire intensity image. The optimal exposure time is typically based at least in part on one or more settings for the imaging device.

In one example, the first image is of a biological material, wherein the biological material may be stained or otherwise comprise a first biomarker. The biomarker may comprise a fluorescent biomarker, whereby the first image of the biological material will exhibits a signal in a fluorescent channel corresponding to the biomarker. The biological material may be stained with a second biomarker, whereby the method may further comprise taking a second image at the same or a different optimal exposure time. The method may further comprise, adjusting a pixel intensity of one or more pixels in the second image, based at least in part on the dark pixel intensity, for a second exposure time that is different from the optimal exposure time. The first and second image may be registered to form a composite image. The images may be registered, for example, by identifying one or more morphological features and aligning or co-registering the images using the identified morphological features. The images may also be registered using other methods such as, but not limited to, aligning the pixels of the images.

The method may further comprise acquiring an autofluorescence image of the biological material, and, in some examples, subtracting the autofluorescence image of the biological material from the first image. The autofluorescence image may also be registered with the first and/or second image. The methods are not limited to acquiring a first and second image. Any number of images may be taken of the material and scaled and/or registered as needed or desired for a given use. Any two or more of the images may be registered to form a composite image.

The methods may also comprise the steps for staining or otherwise applying one or more biomarkers to the biological material, wherein the first image is acquired after the biomarker is applied to the biological material. The biomarkers may be adapted for one or more channels. The biomarker may be applied to the material simultaneously or serially. Images may be taken using filters that correspond to the biomarker channels.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
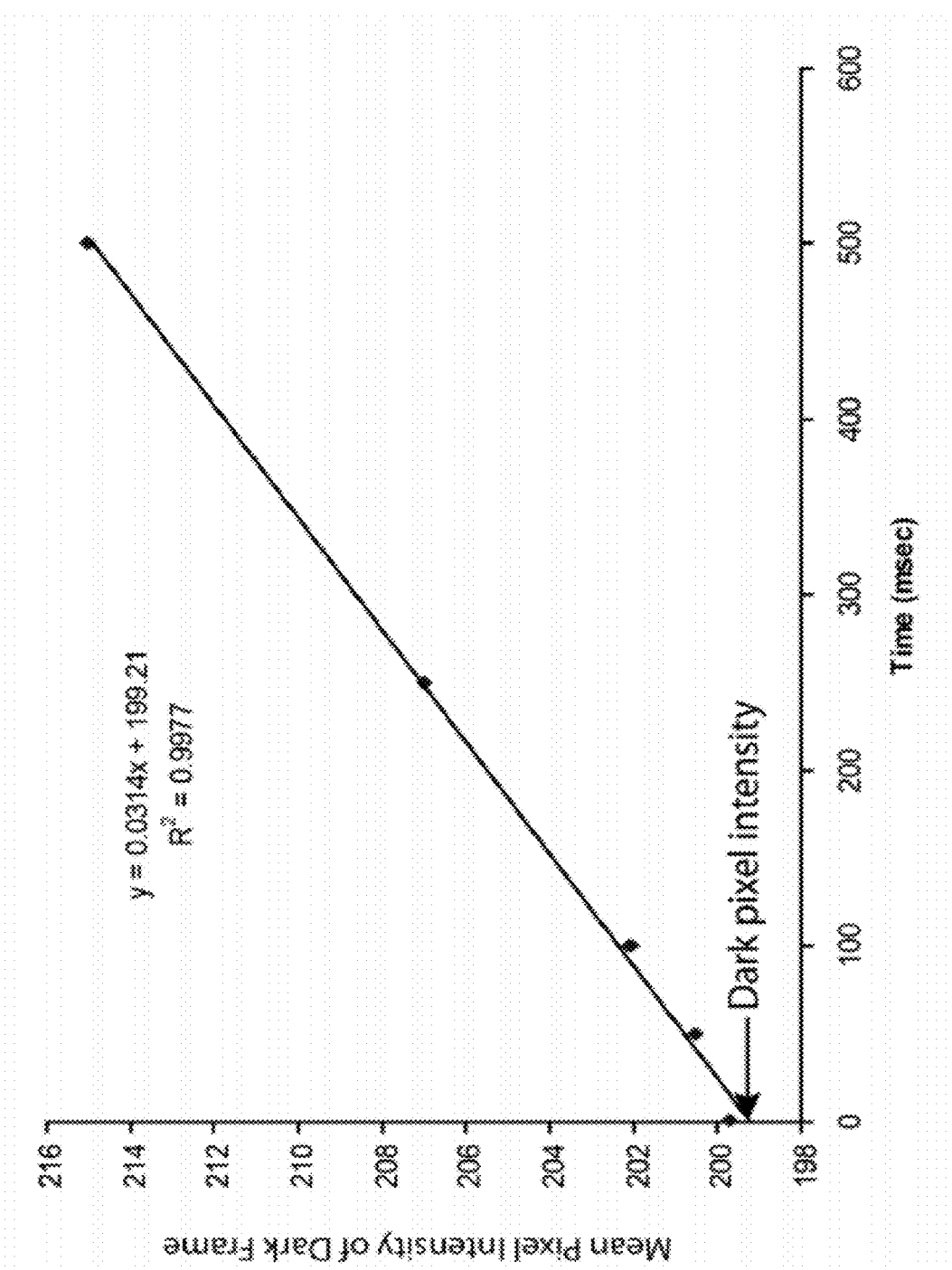
FIG. 1 is a graph of an example of a correlation between mean pixel intensity of dark frame and exposure time associated with a digital imaging device.

One or more of the examples of the methods and systems of the invention provide an accurate estimate of the intensity of the signal from a pixel of a fluorescent image of a microscope specimen at a given exposure time beginning with the actual signal intensity at a different exposure time using the dark pixel intensity of the digital camera used to take the actual image.

Autofluorescence images and stained images are often captured at different exposure times, but image subtraction requires that two images were obtained using the same exposure time. Pixel intensity is generally linear to exposure time as long as images are acquired at the linear range of a camera, but there typically exists an intercept, which is set by the camera. For purposes of this description, this intercept is referred to as dark pixel intensity. The dark pixel intensity is the pixel intensity under conditions of no light and zero exposure time. Dark pixel intensity is determined by a camera's readout noise (electron/pixel), gains, and DC offset. By knowing, or otherwise determining, the dark pixel intensity of an image acquisition set up, an image acquired at one exposure time may be linearly scaled to an image at a different exposure time. Dark pixel intensity may be measured, for example, by obtaining an image at no light and minimum exposure time, or by indirectly calculating the intensity by capturing images at a series of exposure times, Exposure time is a parameter during fluorescence microscope image acquisition and generally ranges from several milliseconds to a couple of seconds although it is not necessarily limited to this range. The correct exposure time is important to maintain a linear representation of fluorescent signals. However, there are other parameters during acquisition that also impact digital images including, but not limited to, analog gain, digital gain, offset and binning.

An example of the method, for scaling an image taken an optimal exposure time to a selected exposure time, generally comprises: determining a dark pixel intensity of an imaging device; acquiring a first image at an optimal exposure time; and adjusting a pixel intensity of one or more pixels in the first image, based at least in part on the dark pixel intensity, for a second exposure time that is different from the optimal exposure time. Determining the dark pixel intensity may comprise, setting an exposure time to zero; acquiring an intensity image; and calculating a mean intensity for the entire intensity image. The optimal exposure time is typically based at least in part on one or more settings for the imaging device. In instances, for example, when a given imaging device cannot be set at zero exposure time, the exposure time may extrapolated to zero or may be set at the lowest possible setting allowable for the given imaging device.

When the mean intensity is calculated, a single value of dark pixel intensity may be applied one dimensionally. It may be extended to a two dimensional matrix, for example, when the image is acquired at zero exposure time. The images may also be averaged. For example, the compensating filter may be either a scalar or an array value.

In one example, the first image is of a biological material, wherein the biological material may be stained or otherwise comprise a first biomarker. The biomarker may comprise a fluorescent biomarker, whereby the first image of the biological material will exhibits a signal in a fluorescent channel corresponding to the biomarker. The biological material may be stained with a second biomarker, whereby the method may further comprise taking a second image at the same or a different optimal exposure time. The method may further comprise, adjusting a pixel intensity of one or more pixels in the second image, based at least in part on the dark pixel intensity, for a second exposure time that is different from the optimal exposure time. The first and second image may be registered to form a composite image. A final image may also be calculated from two or more images, e.g. one image may be subtracted from another image. The images may be registered, for example, by identifying one or more morphological features and aligning or co-registering the images using the identified morphological features. The images may also be registered using other methods such as, but not limited to, aligning the pixels of the images.

The method may further comprise acquiring an autofluorescence image of the biological material, and, in some examples, subtracting the autofluorescence image of the biological material from the first image. The autofluorescence image may also be registered with the first and/or second image. The methods are not limited to acquiring a first and second image. Any number of images may be taken of the material and scaled and/or registered as needed or desired for a given use. Any two or more of the images may be registered to form a composite image.

The methods may also comprise the steps for staining or otherwise applying one or more biomarkers to the biological material, wherein the first image is acquired after the biomarker is applied to the biological material. The biomarkers may be adapted for one or more channels. The biomarker may be applied to the material simultaneously or serially. Images may be taken using filters that correspond to the biomarker channels.

A microscope may be used in the methods and systems to collect photons emitted by a fluorophore and relay them to an imaging device, such as a charge-coupled device (CCD) camera or detector. The CCD array detector converts photons to a photo current, which in turn is converted to a voltage. Each detector voltage in the array is ultimately digitized (A/D convert, e.g., analog gain and digital gain) into a pixel value representing photon intensity. Most scientific grade CCD cameras have 12 bit outputs, with pixel values ranging from 0 to 4095. Quantum efficiency ($Q_e$) and noise both effect CCD detector sensitivity. Photons not captured by a CCD are generally viewed as losses and result in reduced sensitivity. Noise is often generalized into three components: 1) dark noise which is inherent to the photodetector, refers to spurious signal (largely thermally generated) created in absence of incident photons; 2) photon noise which refers to statistical fluctuations in photocurrent resulting from random arrival of photons; and 3) readout noise (also known as read noise) which refers to the combined noise generated by components that convert the photocurrent to a digital word. Collectively these noise components may be referred to as camera noise and represent error that may be introduced during the process of quantifying the electronic signal on the CCD. The signal to noise ratio (SNR) is determined by:

$$SNR = \frac{PQ_e t}{\sqrt{(P+B) \cdot Q_e t + D \cdot t + N_r^2}} \qquad \text{Eq. 1}$$

where: P is photon flux (signal) incident on the CCD (photon/pixel/second), B is background photon flux incident on the CCD (photon/pixel/pixel), t is integration time or exposure time (second), D is the dark current in electrons/pixel/second and $N_r$ is readout noise (root mean square electrons/pixel). The SNR is time/speed dependent, longer integration time yields higher SNR. As such, there is a trade-off between rate (frame/second) and detection limit. The SNR is proportional to the square root of the integration time. For example, in the process of relating different protein expression levels using fluorescence microscopy, it may be desirable to use a different integration time for each protein. The effect of dark current, readout noise, and exposure time on pixel intensity of a digital image (e.g. staining intensity of a protein) affects the accuracy of quantification.

The output of the CCD camera is ultimately a digital word produced by conversion of photoelectrons to a voltage, which is the amplified as needed and processed by an analog to digital converter (ADC). A brief consideration of the noise terms associated with the process will follow. A voltage signal is produced by the individual photodetectors that comprise the CCD according to the following equation:

$$V_{signal} = N_{pe} \cdot \left(\frac{q \cdot G}{C}\right) \qquad \text{Eq. 2}$$

where $N_{pe}$ is the number of photoelectrons generated, q is the charge of an electron, G is the voltage gain of the amplifier stage (typically unity) and C is the capacitance of the detector. The trans-impedance gain $$\left(\frac{q \cdot G}{C}\right)$$

is expressed in μV/electron, and is typically on the order of 0.1 to 10, depending on the size of the detector. The voltage is then converted to a digital word by comparison with the ADC reference voltage.

In one or more examples of the methods, the estimate is obtained by subtracting the dark pixel value from the signal intensity measured at a given exposure time, multiplying this difference by the ratio of the exposure time for which an estimate is desired by the exposure time for the actual image and subtracting the dark pixel intensity from this result. One example of the methods comprises using the algorithm $I_{t2}$−DarkpixelIntensity=$(t_2/t_1)*(I_{t2}$−DarkpixelIntensity).

The dark pixel intensity may be determined in various ways such as using a single measurement at zero exposure time and taking several measurements, each at a different exposure time, and extrapolating to zero exposure time. Most digital cameras adapted to be used with fluorescent microscopes allow an image to be taken at zero exposure time. In one or more examples, this comprises taking an image with the camera isolated from a source of illumination and depending on the set up may also involve taking an image with no specimen. Software can be used to obtain an average intensity value across all the pixels in a field of view. In one example, this value can simply be used as the dark pixel intensity while in another example the average value for each exposure time may be used to extrapolate back to zero exposure time. In doing such an extrapolation, the average intensity may be assumed to be a linear function of exposure time.

The dark pixel intensity may be the same across the common measurement channels. Its value is therefore generally independent of the measurement channel used to determine its value.

One or more examples of the methods of the invention may also comprise using the dark pixel intensity to improve the accuracy of autofluorescence corrections. Such corrections may comprise correcting a first image with measurements made on a second image. This second image may be taken at a different exposure time than the first image thus one of the two images may be adjusted to what it would have been had it been taken at the exposure time of the other image.

One or more examples of the methods comprise, determining the dark pixel intensity of a given camera setup to allow projections of the effect of exposure time on the intensity at a given pixel in taking images in fluorescent microscopy. An initial determination is made of the dark pixel intensity of a digital camera apparatus adapted to take fluorescent images through a microscope. The dark pixel intensity may be at least partly dependent on a given apparatus set up and is the same for all fluorescent channels for that set up. Such values may then be used in projecting or estimating the intensity at a given pixel at a given exposure time given a measured value of the intensity at that pixel for a different exposure time. This projection may be used to remove the effects of autofluorescence from an image of a biological sample. The dark pixel intensity of a given camera set up may be determined, for example, from a measurement at zero exposure time or an extrapolation to zero exposure time of measurements made at several exposure times. In either example, suitable software may be used to sum the intensity of the signals from all the pixels that the digital camera is reading and produce an average value.

In the first example, a reading is taken from the camera in the absence of any illumination. This may be accomplished by taking a reading from the camera output with the shutter that regulates the input of light to the camera shut. The dark pixel reading is dependent upon a given exposure time, for example, the time interval over which pixel signals are read from the camera. Readings may be taken at a number of exposure times. For example, multiple readings may be taken between 1 and 500 milliseconds and apply a linear regression equation to project the value at zero exposure time. The reading may also be taken over a very short time interval such as, for example, one millisecond.

In the latter example, the dark pixel intensity may be determined from a series of images of the same field of view taken in a given fluorescent channel at various exposure times. A pixel signal intensity average may be generated for each exposure time, for example, by summing the signals from all of the pixels being read by the camera and divide this value by the number of pixels involved to yield an average value. A linear regression analysis may then be applied to determine a relationship between exposure time and average pixel signal intensity. Such a relationship may be used to project the signal intensity at zero exposure time that is the dark pixel intensity. The relationship between exposure time and the average pixel signal intensity is substantially linear over the range of exposure times in which pixels have not become saturated with incident light, whereby their signal output is no longer proportional to the incident light to which they are exposed.

The improved projection of pixel signal intensity at a particular exposure time may be used to adjust or correct a given image for autofluorescence effects. In determining and removing the effects of autofluorescence from a given fluorescent image, an exposure time may be used which is not optimum or even practical for an image displaying the features of interest. For instance, when measuring the autofluorescence of a sample material, the exposure time for a given fluorescent channel, to obtain a desirable signal to noise ratio, may need to be longer than typically optimal for an image of the specimen after it has been stained with a fluorescent marker active in that channel. If the specimen takes up a significant amount of the stain because it contains an abundance of the feature to which the stain is directed, an optimal exposure time for a stained image may be considerably shorter than the optimal time exposure time for determining autofluorescence. It also may well be that at the longer exposure times, the pixels of the sample image would become so saturated that they would not able to provide any more signal if the amount of incident light they are exposed to increases further beyond the saturation level.

EXAMPLE

For the camera, a Hamamatsu ORCA-ER-12AG deep cooled digital camera (model: C4742-80-12AG, Hamamatsu City, Japan) was used. Its dark current was 0.03 electrons/pixel/s. readout noise is 6 RMS electrons /pixel. The imager was a Z1 upright microscope (Carl Zeiss MicroImaging Inc. Thornwood, N.J.) with 20× Plan Apochromat objective (NA=0.8). Grayscale images were acquired using a DAPI filter set (Excitation @365/40 nm and Emission @445/50 nm), Cy3 filter cube (Excitation @550/25 nm and Emission @605/70 nm), and Cy5 filter cube (Excitation @640/30 nm and Emission @690/50 nm). Analog gain, digital gain, analog offset, and digital offset were all set at zero.

To prepare the sample, paraffin-embedded LNCaP cells IHC control SignalSlide™ (#8101) were obtained from Cell Signaling Technology (Beverly, Mass.). A breast cancer slide was obtained from Thermo Fish Scientific (Fremont, Calif.). A normal skin slide was obtained from Biochain (Hayward, Calif.). After standard dewaxing and antigen retrieval treatments, LNCaP cells were incubated with rabbit monoclonal glycogen synthase kinase-3 (GSK-3) antibody (1:50, Cat#CS9315, Cell Signaling Technology) at 4° C. overnight. Secondary Donkey anti-rabbit antibody, conjugated with Cy3 (Jackson ImmunoResearch, West Grove, Pa.), was incubated (1:250) for 1 hour at room temperature. The breast cancer slide and skin tissue slide were stained with ALCAM antibody (1:40, Product ID: NCL-CD116, Leica microsystem, Bannockburn, Ill.). Donkey anti-mouse antibody,conjugated with Cy3 and Cy5 secondary antibodies, were used for breast cancer slide and skin tissue slide, respectively. All slides were finally counterstained with DAPI and mounted with VectaShield (H1000, Vector Laboratory, Burlingame, Calif.).

To determine the dark pixel intensity, the reflector remained closed to avoid light entering the camera. Triple images (no sample) were acquired using different exposure times (1, 50, 100, 250, 500 msec). Images were saved as ZVI format to retain acquisition setting and raw TIFF intensity values. Each image was subsequently read by ImageJ Bio-Format Importer and mean intensity of each image was measured using ImageJ (National Institutes of Health, version 1.42d).

To correlate pixel intensities of the two images obtained at different exposure time at each pixel, the SignalSlide was used to capture two images at 200 msec and 500 msec. The images were exported to TIFF format and subsequently read by MATLAB image processing toolbox (MathWork, Natick, Mass.). The pixel intensities were stored in two matrices with a dimension of 1344×1024. To compare pixel intensities at a corresponding position, the 2D matrix was "reshaped" to a 1D matrix (1375625×1). A MATLAB statistics toolbox was used to perform linear regression between two 1D matrices.

To investigate the relationship between pixel intensity and exposure time at region of interest (ROI) level, the normal skin slide and breast cancer slides stained with ALCAM, a membrane protein, were used. These slides were imaged using no light, and with light and exposure times of 0, 1, 2, 4, 8, 16, 32, 64, 96, 128, 160, 200, 250, 300, 350, 400, 450, 500, 550, 600 msec. Two images were obtained for each exposure time. A region of background (no tissue) was manually selected using drawing function of ImageJ. DAPI background and Cy3 background were quantified using ROI manager function and selecting only background region. DAPI channel image exposed at 16 msec (optimal exposure time) was thresholded to identified DAPI positive area and was used to define nuclear mask. This mask was applied to all images and DAPI signal was quantified only within the masked regions. Cy3 signal and Cy5 signal were quantified on the membrane region using a similar approach.

To calibrate fluorescence intensity, standard fluorescence beads (F36909, Invitrogen, Carlsbad, Calif.) were used as the fluorescence intensity standard. The intensities of the beads are listed as 0.00667, 0.03, 0.1, 0.33, and 1. The beads were first imaged at a constant exposure time of 75 msec. Then different exposure times were used for these beads. Specifically, 300 and 150 msec were used for beads of intensity 0.00667, 150 and 75 msec for beads of 0.03 and 0.1. 75 and 30 msec for beads of 0.33, and 30 msec for beads of 1.

Table 1 shows the changes in mean pixel intensity in response to exposure time without light emission to the camera. There is a slight increase in mean intensity with exposure time. The average is about 200, which expends 5% of the dynamic range of a 12-bit camera. To separate the dark noise contribution (proportional to exposure time) from the readout noise contribution (constant), a linear regression was obtained.

TABLE 1

Mean and Standard Deviation of Dark Image Intensity

| Image Name | Stat | Exposure Time (msec) | | | | |
|---|---|---|---|---|---|---|
| | | 500 | 250 | 100 | 50 | 1 |
| DarkImage1 | Mean | 215.0 | 207.0 | 202.1 | 200.6 | 199.7 |
| DarkImage2 | | 215.0 | 207.0 | 202.0 | 200.5 | 199.7 |
| DarkImage3 | | 215.0 | 207.0 | 202.1 | 200.5 | 199.7 |
| DarkImage1 | StdDev | 2.93 | 2.47 | 2.20 | 2.10 | 2.22 |
| DarkImage2 | | 2.94 | 2.47 | 2.20 | 2.10 | 2.22 |
| DarkImage3 | | 2.94 | 2.47 | 2.20 | 2.10 | 2.21 |

$$\text{PixelIntensity} = 0.0314 \cdot t + 199.21 \quad \text{Eq. 3}$$

Since noise exhibits a Poisson distribution in a counting system, where the standard deviation is square root of the mean, the observed signal on a CCD camera is given by $$\text{Signal} = (P+B) \cdot Q_e t + D \cdot t + N_r^2 \quad \text{Eq. 4}$$

Under the condition of no light, DarkSignal is given by $$\text{DarkSignal} = D \cdot t + N_r^2 \quad \text{Eq. 5}$$

DarkSignal is given in the unit of electron/pixel. This signal will undergo A/D convert and finally digitize to PixelIntensity, $$\text{PixelIntensity} = G(D \cdot t + N_r^2) + \text{offset} \quad \text{Eq. 6}$$

where G is the combined gain (digital gain and analog gain), and offset is combined offset.

Comparing Eq. 3 and Eq. 6, the slope is 0.0314 (G·D). Since D is 0.03 electron/pixel/sec (from manufacturer data sheet), suggesting G is very close to 1. Both analog and digital gains were set at 0. The calculated constant/intercept (G·$N_r^2$+ offset) can be lumped into one constant, dark pixel intensity. It comprises the combination of $N_r^2$ and offset. Dark pixel intensity is independent of dark current or exposure time, and it is a constant as long as camera setting is fixed except for exposure time.

It is clear from Eq. 3 that the majority of PixelIntensity is from $N_r^2$ and offset (199.21). Dark current has only a negligible effect with a slope of 0.0314.

FIG. 1 shows an example, using a Hamamatsu camera, of the correlation between dark pixel intensity and noise RMS.

To determine the effect of exposure time on the pixel intensity at the individual pixel level, SignalIntensity, in this example, follows an equation similar to Eq. 6.

$$\text{SignalIntensity}=G[(P+B)\cdot Q_e t+D\cdot t+N_r^2]+\text{offset} \quad \text{Eq. 7}$$

Rearrange Eq. 7 to obtain $$\text{SignalIntensity}=G[(P+B)\cdot Q_e+Df\cdot t+\text{DarkPixelIntensity} \quad \text{Eq. 8}$$

where DarkPixelIntensity=$G\cdot N_r^2$+offset, and it is the intercept (199.21) in FIG. 1. For the end user of fluorescence microscope, dark pixel intensity can be approximately determined by acquiring an image under no light condition and exposed at the zero or shortest exposure time allowed by the camera and then measuring the average intensity of the image. To adjust image pixel intensity to different exposure time, the following simplified equation may be used:

$$\frac{\text{Intensity}(t_1) - \text{DarkpixelIntensity}}{t_1} = \frac{\text{Intensity}(t_2) - \text{DarkpixelIntensity}}{t_2} \quad \text{Eq. 9}$$

Figure 2A:
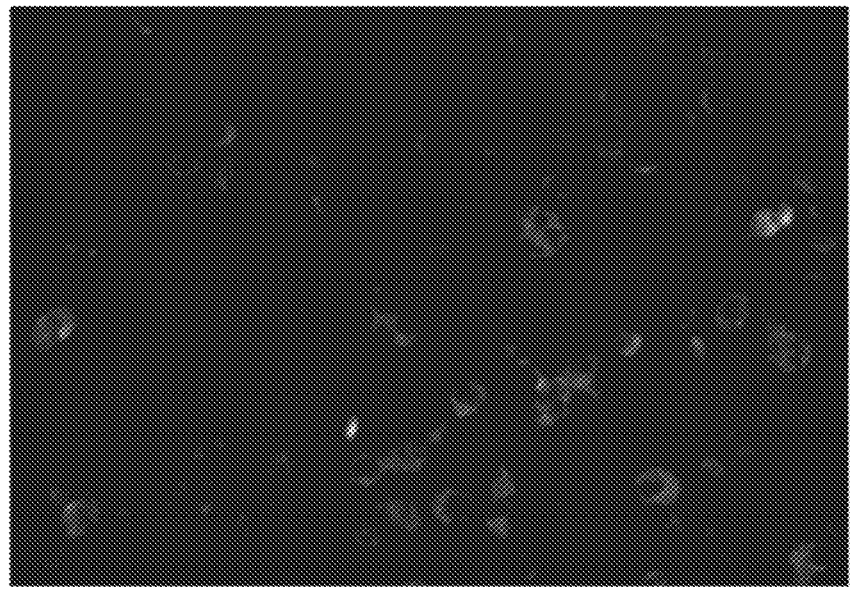
FIG. 2A is an image having an exposure time of 200 msec.
Figure 2B:
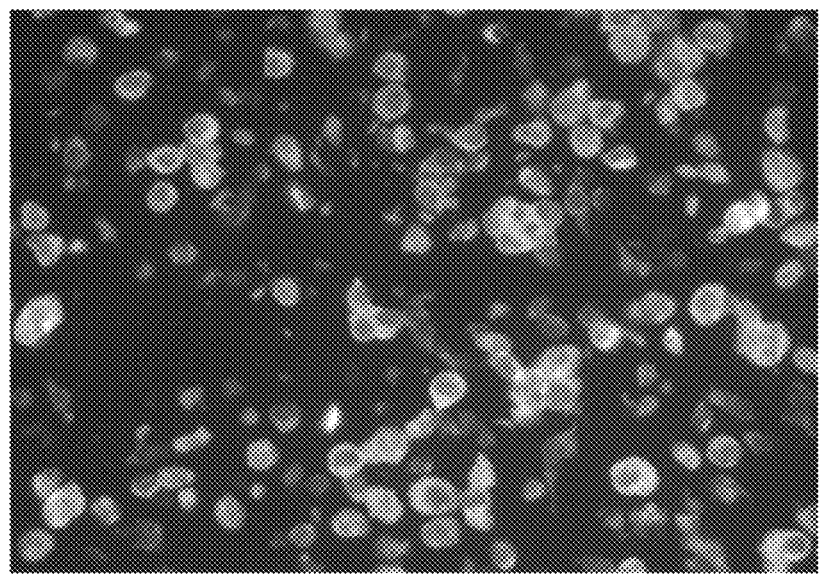
FIG. 2B is the image of FIG. 2A having an exposure time of 500 msec.
Figure 2C:
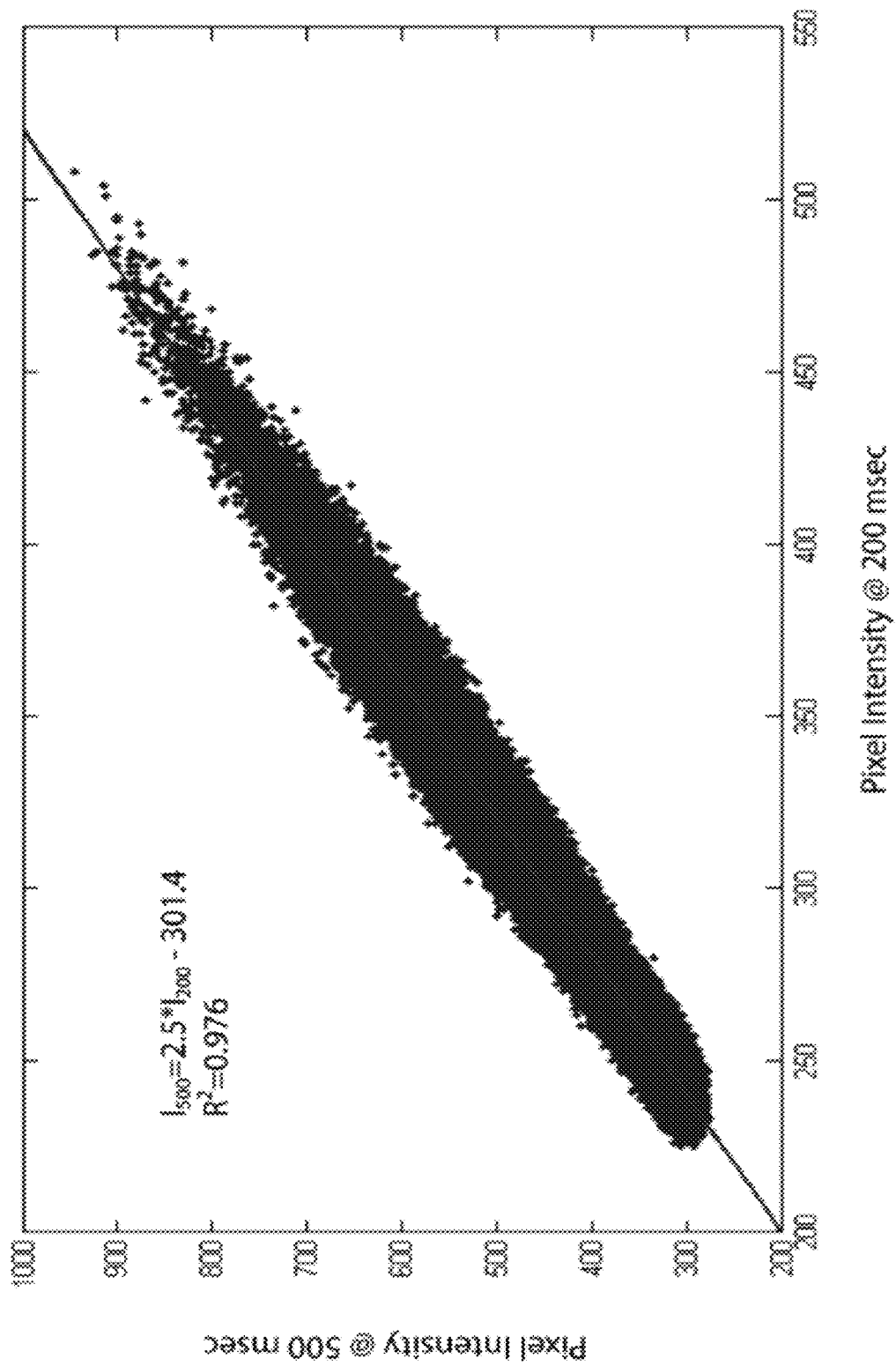
FIG. 2C is a scatterplot of the pixel intensities of FIGS. 2A and 2B.

This equation can be used at single pixel level, ROI level, and whole image level. FIG. 2 shows pixel intensities at corresponding positions from two images exposed at 200 msec (A) and 500 msec (B). The regression analysis suggests the linear relationship:

$$I_{500m.sec}=2.5\cdot I_{200m.sec}-301 \quad \text{Eq. 10}$$

The error variance from the regression line is 172 and it is uniform across the dynamic range of pixel intensity. The slope, 2.5, was the ratio of exposure time (2.5 in this case). $R^2=0.976$. The intercept of this regression (301) seems to be different from the intercept of 199. However, a simple transformation of Eq. 10 reveals dark pixel intensity exactly same as what we obtained before.

$$I_{500m.sec}-200.9=2.5\cdot(I_{200m.sec}-200.9) \quad \text{Eq. 11}$$

Importantly the regression intercept 200.9 is very close to the dark pixel intensity of 199.12, as determined under the condition of no light.

Figure 3:
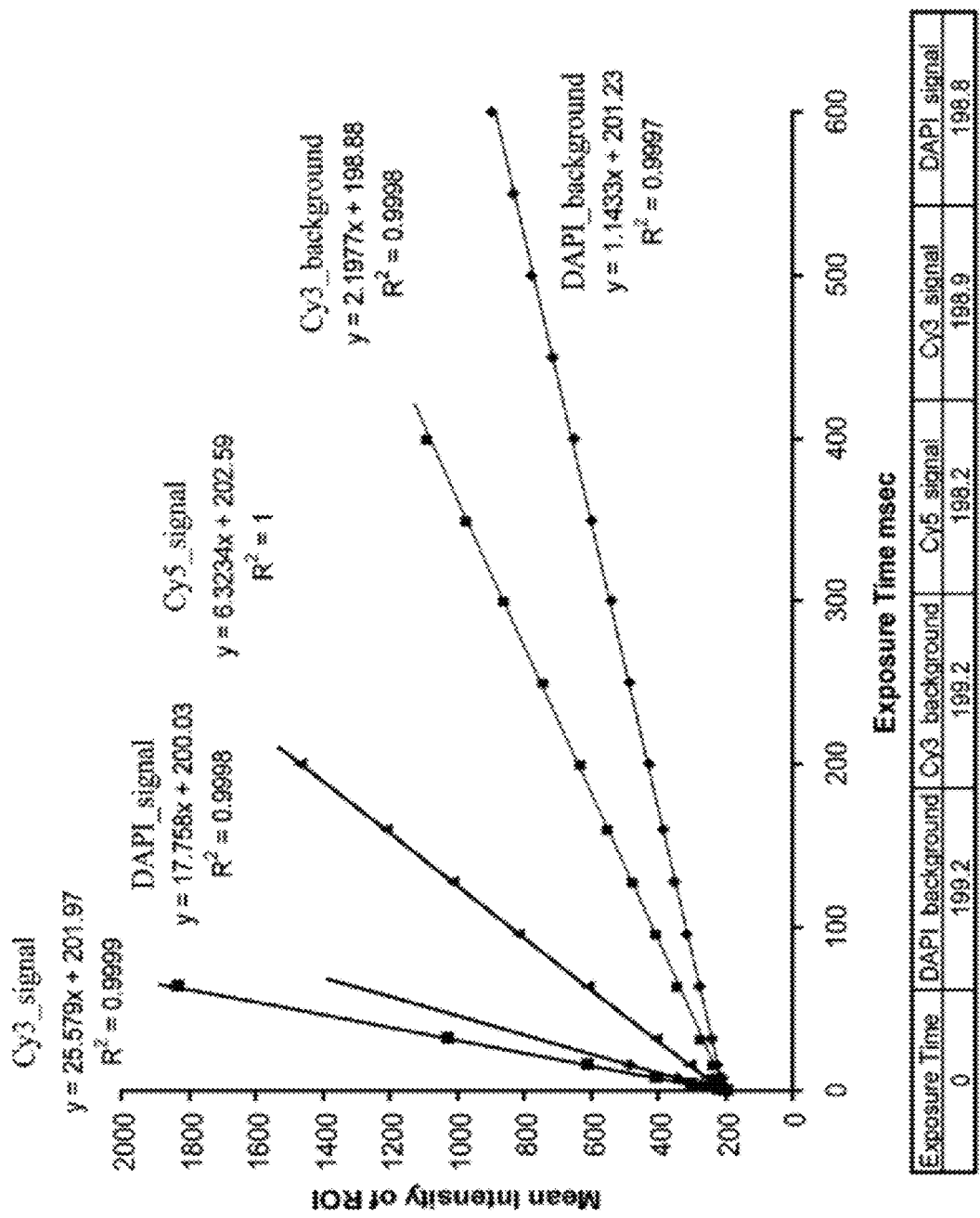
FIG. 3 is a graph of an example of the effect of exposure time on pixel intensity at a given region of interest.

One of the common tasks in quantitative fluorescence microscopy is to measure the staining intensity at different ROIs such as nuclear or cytoplasmic regions. Using ImageJ the whole images were segmented into the background (no tissue/cells), nuclear area and membrane area, and plotted the respective signals against exposure time (FIG. 3). There is a clear linear relationship between exposure time and intensity at different ROIs and using different channels (DAPI, Cy3, and Cy5). Intercepts/dark pixel intensity for all these lines varies between 199.9 to 202.6, virtually same as 199 as we measured before. At the bottom of the figure, mean pixel intensity for dark image at 0 exposure time were also shown. The slope for each line is $G[(P+B)\cdot Q_e+D]$, representing normalized signal intensity. At background regions, the slope becomes $G[(B)\cdot Q_e+D]$.

Staining intensity is $GPQ_e t$. It should be calculated by the difference between signal and background (no dark pixel intensity). Since both signal intensity and background intensity contain the same dark pixel intensity, they are canceled out. Normalized staining intensity can be simply defined as $$\text{NormalizedStainingIntensity} = \frac{\text{SignalIntensity} - \text{BackgroundIntensity}}{t} \quad \text{Eq. 12}$$

To validate Eq. 12, different exposure times were used to capture images of standard fluorescence intensity beads. The intensities of these beads vary almost 150 fold, as a result no single exposure time can capture all these beads at their optimal condition.

In one or more of the examples of the methods, dark pixel intensity is a camera offset and an additive to the signal intensity in an image. It may be determined by one or more of the readout noise, analog gain, digital gain, analog offset, digital offset, and other settings. From the perspective of end users, dark pixel intensity is constant as long as camera acquisition setting is fixed except for exposure time. Dark pixel intensity may be determined by acquiring an image under the conditions of no light and zero (minimum) exposure time followed by calculating mean intensity of the image. As a non-limiting example, a dark pixel intensity of 200 may contribute at least 10% for a normal fluorescence image with a mean intensity of 2000. By predetermining the dark pixel intensity of a set up, an image acquired at one exposure time may be scaled to another, for example, using Eq. 9.

Dark pixel intensity and background intensity (or lowest pixel intensity) are distinguishable. For example, background intensity may be determined by $G[(B)\cdot Q_e+D]\cdot t$+DarkPixelIntensity. As a result, background intensity is typically greater than dark pixel intensity and increases with exposure time. When the staining of biomarker is weak and a longer exposure time is required, the background intensity may be, for example, as high as 1000-3000. In contrast, dark pixel intensity is a constant (e.g. 200) as long as the camera acquisition settings are fixed except for the exposure time.

Staining intensity of a biomarker is the difference between signal intensity and background intensity (within an image). Subtraction of the background intensity removes the contribution from scattered light from glass slide, dark current, and dark pixel intensity. However, it may still be contaminated with autofluorescence. Eq. 12 may be used to compare the staining intensity of a given bio marker.

Temperature may also affect the dark pixel intensity. With increased temperature, an electron is much easier to move, therefore, both dark current and readout noise are function of temperature. In the Example, the temperature of the camera was regulated at −30° C. as long as the environment temperature is in the range of −5 to 40° C. This cooling temperature is generally associated with digital cameras. Low temperatures will contribute to low dark current as well as readout noise.

It may be beneficial to set the offset to dark pixel intensity. Therefore, this value will be subtracted from the final pixel intensities and pixel intensity will be proportional to exposure time. One advantage of using an offset is to increase the dynamic range of pixel intensity. The offset though should be the same as dark pixel intensity to achieve the most benefit.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for scaling an image taken at a given exposure time to a selected exposure time, comprising,
   determining a dark pixel intensity of an imaging device, wherein determining the dark pixel intensity comprises,
      setting an exposure time to zero, wherein the exposure time comprises a time interval over which pixel intensity signals are read from the imaging device;
      acquiring an intensity image; and
      calculating a mean intensity for the entire intensity image;
   acquiring a first image at a given exposure time, wherein the first image comprises a fluorescence microscopy image of a biological material comprising a first biomarker;
   acquiring a second image at a different exposure time, wherein the second image comprises a fluorescence microscopy image of a biological material comprising a second biomarker;
   adjusting a pixel intensity of one or more pixels in the first image, based at least in part on the dark pixel intensity, for a second exposure time that is different from the given exposure time; and
   adjusting a pixel intensity of one or more pixels in the second image, based at least in part on the dark pixel intensity, for a second exposure time that is different from the given exposure time,
   wherein adjusting the pixel intensity at least in part uses the following equation:

$$I_{t_2} = \frac{t_2}{t_1} I_{t_1} - \left(\frac{t_2}{t_1} - 1\right) DarkpixelIntensity$$

wherein $t_1$ is the given exposure time, $t_2$ is the second exposure time, $I_{t_1}$ is a signal intensity of a given pixel for exposure time $t_1$, $I_{t_2}$ is an estimated signal intensity for exposure time $t_2$ and DarkpixelIntensity is the dark pixel intensity for the imaging device.

2. The method of claim 1, wherein the given exposure time is based at least in part on one or more settings for the imaging device.

3. The method of claim 1, wherein the biomarker is a fluorescent biomarker.

4. The method of claim 1, wherein the first image of the biological material exhibits a signal in a fluorescent channel.

5. The method of claim 1, further comprising registering the first and second image to form a composite image.

6. The method of claim 1, further comprising acquiring an autofluorescence image of the biological material.

7. The method of claim 6, further comprising subtracting the autofluorescence image of the biological material from the first image.

8. The method of claim 7, further comprising applying a biomarker to the biological material, wherein the first image is acquired after the biomarker is applied to the biological material.

9. The method of claim 8, further comprising registering the autofluorescence image and the first image.

10. The method of claim 7, further comprising applying another biomarker to the biological material, and acquiring a second image of the biological material.

11. The method of claim 10, further comprising registering the first image and the second image.

12. The method of claim 10, further comprising applying one or more additional biomarkers, each corresponding to a channel, to the biological material, and acquiring one or more additional images for each of the biomarker channels.

13. The method of claim 12, further comprising registering the first, second and additional images to form a composite image of the channels.

* * * * *